July 21, 1931. J. A. WILLARD 1,815,488
BATTERY SUPPORT
Filed Dec. 3, 1930

J. A. WILLARD.
INVENTOR.

BY Paul Eaton

ATTORNEY.

Patented July 21, 1931

1,815,488

UNITED STATES PATENT OFFICE

JAMES A. WILLARD, OF GREENSBORO, NORTH CAROLINA

BATTERY SUPPORT

Application filed December 3, 1930. Serial No. 499,791.

This invention relates to an improved battery support for automobiles, and comprises means for renewing the battery support in an automobile when the support with which the automobile is equipped becomes worn or eaten out and a new one is required for replacement, also this device can be installed in new automobiles.

It is a well known fact that with the conventional battery support which is usually one sheet of metal for the support of the battery that the acid from the battery collects on the support and the same is soon eaten away and a new battery support has to be installed. In some forms of supports there has been attempts to provide a replaceable support but these have resulted in the rods which support the battery support being worn in two parts, the support and the automobile is thus left in the condition in which no battery can be supported without great expense in the installation of new parts for the support of the battery support.

Some of the objects of the invention having been stated, other objects will appear as the description proceeds when taken in connection with the accompanying drawings, in which—

Figure 1:
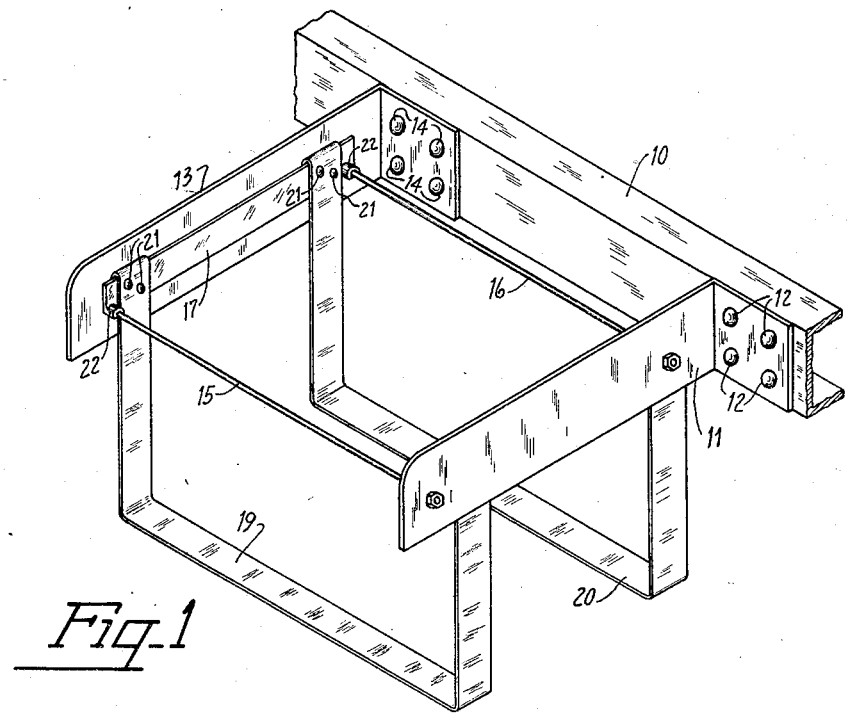
Figure 1 is a perspective of my battery support with a portion of the frame of the automobile being shown in connection therewith.
Figure 3:
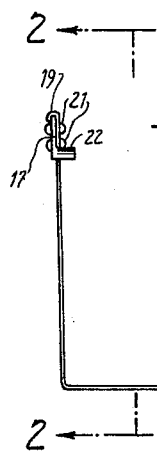
Figure 3 is a side view of my support.
Figure 2:
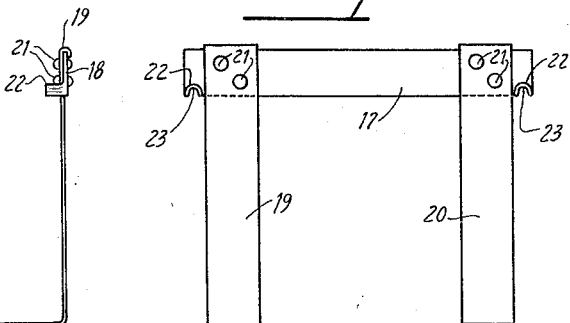
Figure 2 is a cross-sectional view of the support taken along the line 2—2 in Figure 3.

Referring more particularly to the drawings, the numeral 10 indicates a portion of an automobile framework, which may be one side of the chassis, to which is secured members 11 and 13 by means of rivets 12 and 14 respectively, these members 11 and 13 being parallel to each other and at right angles to the member 10.

Secured in parallel spaced relation to each other in the members 11 and 13 are the rods 15 and 16. Transversely disposed members 17 and 18 are adapted to have engagement with these rods 15 and 16, these members 17 and 18 being secured to each other by means of the U-shaped members 19 and 20 which members are secured in parallel spaced relation to each other to the members 17 and 18 by means of rivets 21. These members 17 and 18 at each end thereof have the transversely disposed enlargement 22 which has a semi-circular bearing portion 23 on the lower side thereof adapted to fit onto the rods 15 or 16 to present a wide bearing surface on these rods 15 and 16. Were it not for these enlargements 22 the members 17 and 18 would soon act like a file or saw to cut the rods 15 and 16 in two parts, but by providing the enlarged bearing surfaces 23, this is prevented.

Another advantage of this battery support is that it is easily removable and furthermore on account of the supports 19 and 20 being spaced apart from each other, it causes the acid which may overflow from a battery to drip out on the ground or pavement and not become lodged in any part of the battery support to eat away the same.

It is thus seen that I have devised an improved and strong battery support which can be quickly installed into an automobile and which is simple in construction and which is capable of long life.

In the drawings and specification there has been set forth a preferred embodiment of the invention, and although specific terms are employed, they are used in a generic and descriptive sense only, and not for purposes of limitation, the scope of the invention being set forth in the appended claims.

Claims:

1. In a battery support, two transversely disposed members, enlarged bearing surfaces on said members adapted to engage parallel rods for support, and two U-shaped members spaced apart from each other and having their ends secured to said transversely disposed members.

2. In a battery support for batteries of automobiles and the like, two transversely disposed members mounted in spaced and parallel relation, enlarged bearing surfaces on the lower surfaces of said supports and near the ends thereof, and two parallel U-shaped members spaced apart from each other and having their ends secured to the transversely disposed members.

3. In a battery support for the batteries of automobiles and the like, said automobile having two longitudinally disposed rods spaced apart from each other and between which the battery is adapted to be supported, two transversely disposed parallel members having enlarged supporting surfaces adapted to engage said rods, and two parallel U-shaped members spaced apart from each other and having their ends secured to the two transversely disposed members, said transversely disposed members, the two U-shaped members, and the rods forming a cradle for supporting the battery.

In testimony whereof I affix my signature.

JAMES A. WILLARD.